United States Patent [19]

Konchin et al.

[11] Patent Number: 5,790,016

[45] Date of Patent: Aug. 4, 1998

[54] TIRE PRESSURE SENSING SYSTEM

[75] Inventors: Boris Konchin, Toronto; Slavik Isakov, North York, both of Canada

[73] Assignee: Algonquin Scientific, LLC, Troy, Mich.

[21] Appl. No.: 782,430

[22] Filed: Jan. 15, 1997

[51] Int. Cl.[6] .................................................. B60C 23/00
[52] U.S. Cl. .................... 340/448; 340/442; 340/445; 73/708; 73/724; 73/146.4; 73/146.5
[58] Field of Search .......................... 340/442, 445, 340/448; 73/708, 715, 718, 723, 724, 146.4, 146.5; 361/275.2, 283.4

[56] References Cited

U.S. PATENT DOCUMENTS

| | | | |
|---|---|---|---|
| 3,807,226 | 4/1974 | Williams | 73/146 |
| 3,934,223 | 1/1976 | Barabino | 152/418 |
| 4,067,376 | 1/1978 | Barabino | 340/448 |
| 4,180,795 | 12/1979 | Matsuda et al. | 340/448 |
| 4,392,382 | 7/1983 | Myers | 73/708 |
| 4,588,978 | 5/1986 | Allen | 340/448 |
| 4,695,823 | 9/1987 | Vernon | 340/448 |
| 4,701,826 | 10/1987 | Mikkor | 361/283 |
| 4,717,905 | 1/1988 | Morrison, Jr. et al. | 340/448 |
| 4,814,744 | 3/1989 | Collins | 340/443 |
| 5,006,844 | 4/1991 | Ohta et al. | 340/448 |
| 5,071,259 | 12/1991 | Metzger et al. | 374/143 |
| 5,083,457 | 1/1992 | Schultz | 73/146.5 |
| 5,181,423 | 1/1993 | Phillips et al. | 73/724 |
| 5,196,845 | 3/1993 | Myatt | 340/870.31 |
| 5,218,861 | 6/1993 | Brown et al. | 73/146.5 |
| 5,274,355 | 12/1993 | Galan | 340/445 |
| 5,473,938 | 12/1995 | Handfield et al. | 73/146.5 |
| 5,663,506 | 9/1997 | Moore et al. | 73/708 |

*Primary Examiner*—Jeffery A. Hofsass
*Assistant Examiner*—Ashok Mannava
*Attorney, Agent, or Firm*—Harness, Dickey & Pierce, PLC

[57] ABSTRACT

A system is provided for monitoring tire pressure which includes a sensor mounted within a tire that triggers a train of pulses when tire pressure reaches a level outside predetermined parameters. The system also includes a receiver mounted in operative proximity to the sensor at a location exterior to the tire. The receiver is electromagnetically coupled to the sensor and the sensor is activated in response to tire pressure reaching a level outside predetermined parameters. Also provided is an indicator which is coupled to the receiver, which signals when the tire pressure reaches a level outside predetermined parameters. The sensor is mounted within the tire that senses tire air pressure. The receiver is mounted within operative proximity to the sensor and at a location external to the tire and is electromagnetically coupled to the sensor to generate signals dispersed by the sensor that are indicative of tire air pressure sensed by the sensor. The tire pressure indicator is coupled to the receiver that converts tire air pressure signals generated by the receiver into a driver readable output.

35 Claims, 9 Drawing Sheets

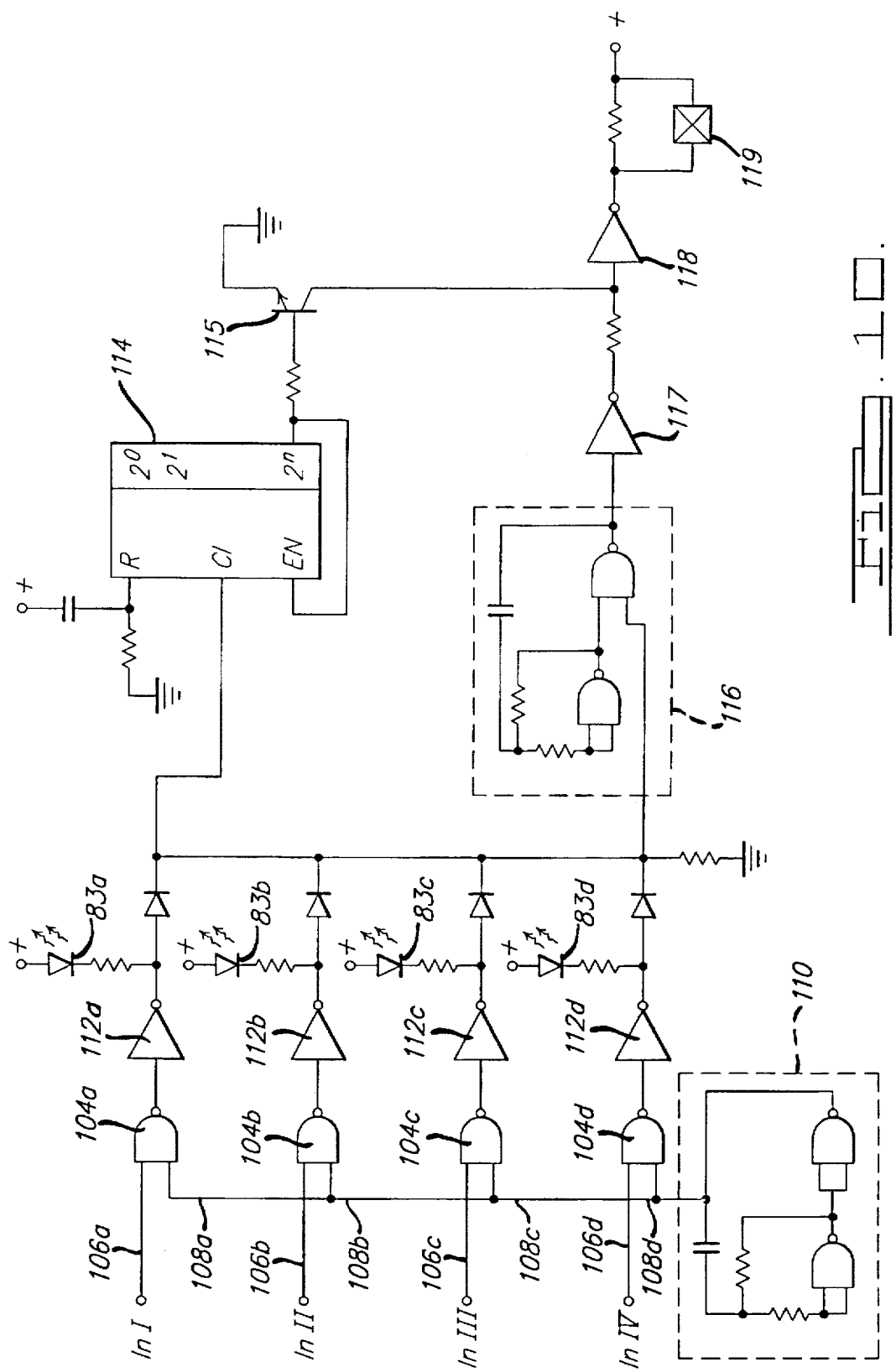

5,790,016

TIRE PRESSURE SENSING SYSTEM

BACKGROUND OF THE INVENTION

1. Technical Field

The present invention relates generally to condition monitoring systems and, more particularly, to a system that monitors air pressure in the tires of a motor vehicle, and that generates a signal indicative of the tire pressure in each of the tires to improve tire life, minimize tire wear, and increase vehicle performance and safety.

2. Discussion

Correct tire pressure is a critical factor in the safe operation and performance of a motor vehicle. Overinflated tires often result in unnecessary tire wear and less than optimal vehicle performance. Underinflated tires typically result in increased tire wear, decreased vehicle performance, and compromise the ability of the tires to maintain a safe interface with the road.

Conventionally, tire air pressure has been checked with mechanical gauges designed to be inserted over tire inner tube valve stems. Such gauges provide a generally accurate air pressure reading. However, the gauges are incapable of providing continuous monitoring of the air pressure within the tires and are limited in accuracy, and also require a driver concerned about tire air pressure to physically stop and exit the vehicle to check the tire pressure. In addition, such mechanical gauges do not provide any warning indication when the tire pressure reaches a level considered to be dangerous or unsuitable (such as below 14 psi in a typical passenger motor vehicle) for normal driving conditions.

Other systems utilize an active inductor capacitor (LC) circuit affixed within the tire to monitor tire air pressure. However, the active LC circuit requires a power source for operation. Because it is mounted within the tire, the power source, as well as the additional circuit components, are subjected to rotational vibration and other extreme conditions caused by temperature fluctuation. The circuit components are also difficult to install and replace if damaged or depleted due to their location within the tire. In addition, such systems typically provide no warning to the driver when the tire pressure falls below or rises above a certain minimum/maximum acceptable level.

BRIEF DESCRIPTION OF THE DRAWINGS

FIG. 10 is an electrical schematic diagram of the LED interface of the system shown in FIG. 1;

SUMMARY OF THE INVENTION

Accordingly, the present invention provides a tire pressure monitoring system that utilizes a passive LC circuit mounted within the tire for monitoring tire air pressure. The passive circuit requires no power source and therefore is both less expensive to operate and has a longer useful life than conventional tire pressure monitoring systems utilizing active tire pressure sensors. The tire pressure monitoring system of the present invention is configured to provide either an audible or visual indication to the driver when tire pressure in any of the vehicle tires falls below a minimum acceptable level. The tire pressure monitoring system of the present invention may also be configured to provide a continuous digital readout of the actual tire pressure sensed within each of the vehicle tires to the vehicle driver.

In accordance with a first preferred embodiment of the present invention, a system is provided for monitoring an emergency tire pressure which includes a sensor mounted within a tire that generates a signal when tire pressure reaches a level outside predetermined parameters. The system also includes a receiver mounted in operative proximity to the sensor at a location exterior to the tire. The receiver is electromagnetically coupled to the sensor and the sensor is activated in response to tire pressure reaching a level below predetermined parameters. An indicator is coupled to the receiver and signals when the tire pressure reaches a level below the predetermined parameters.

In accordance with a second preferred embodiment of the present invention, a sensor that senses tire air pressure is mounted within the tire. A receiver is mounted within operative proximity to the sensor, at a location external to the tire, and is electromagnetically coupled to the receiver to generate signals from the sensor that are indicative of tire air pressure sensed by the sensor. The tire pressure indicator is coupled to the receiver that converts tire air pressure signals generated by the receiver into a driver readable output indicating to the driver the actual sensed tire pressure.

DETAILED DESCRIPTION OF THE PREFERRED EMBODIMENT

Figure 1:
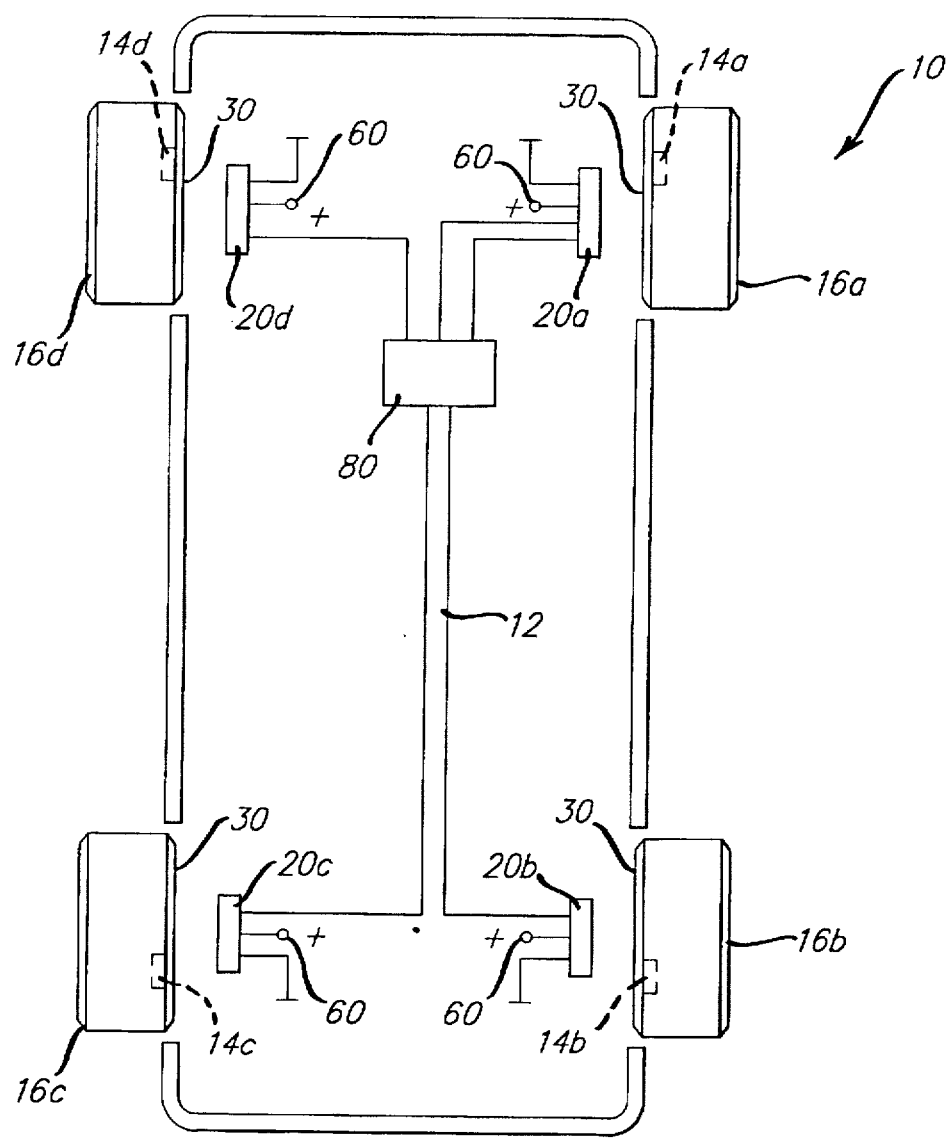
FIG. 1 is a top plan view of a motor vehicle drivetrain including the tire pressure monitoring device of the present invention.

Referring to FIG. 1, a tire pressure monitoring system (TPMS) is shown generally at 10 as installed in the drivetrain 12 of a motor vehicle. The TPMS 10 consists of four sensor transducers 14a–d, each mounted to the inside of a corresponding tire 16a–d, and four receivers 20a–d each mounted via brackets (not shown) to the drivetrain at a distance of several centimeters away from the inner edge of the corresponding tire. The TPMS 10 continuously monitors air pressure within each of the tires 16a–d during motion of the motor vehicle through generation of an electromagnetic coupling between corresponding pairs of sensor transducers 14a–d and receivers 20a–d during an alignment that occurs between the transducers and couplers during each rotation of the tire. As will be described in detail below, this coupling may function to indicate only when tire pressure has fallen below predetermined minimum value, or to continuously inform the driver of the exact pressure within each tire.

Figure 2:
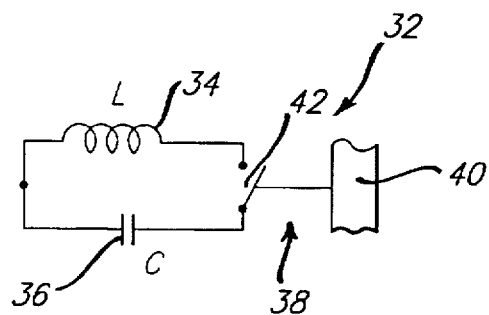
FIG. 2 is an electrical schematic diagram of the tire pressure sensor of the system shown in FIG. 1.

Referring to FIGS. 1 and 2, the structure of each sensor transducer 14a will now be described according to a first preferred embodiment of the present invention, with it being understood that the sensor transducers 14b–d are identical in structure and function. The sensor transducer 14a is preferably mounted to an inner edge 30 of the tire 16a and consists of a circuit 32 including an inductor 34, a capacitor 36, and a switching element 38 including a self-contained diaphragm, or sylfone, 40 for controlling the opening and closing of the switching element 38. The circuit 32 is passive in that it does not require a power source for operation. Rather, the inductor 34 and the capacitor 36 comprise a resident LC contour that is rendered either conductive or non-conductive depending upon the actual pressure inside of the corresponding tire. As described below, the pressure sensor sylfone 40 selectively controls the conductivity of the circuit 32 corresponding to the tire pressure.

Referring to FIG. 2, the inductor 34 preferably consists of several turns of a wire which, for example, may be about 0.05 millimeters in diameter and helically wound in a configuration having a diameter of, for example, 50 to 60 millimeters. The inductor 34, along with the switching element 38, is secured to the interior of the inner tire edge 30 (FIG. 1) through local vulcanization with liquid rubber to permanently secure the inductor to the tire. The capacitor 36 has a value corresponding directly to the pressure within the tire required to close the switching element 38 and cause the circuit to be conductive, and is secured to a cover 44 (FIGS. 3A, 3B) of the switching element 38. Leads from the inductor 34 and the capacitor 36 are soldered together to a base 46 of the switching element 38.

Figure 3A:
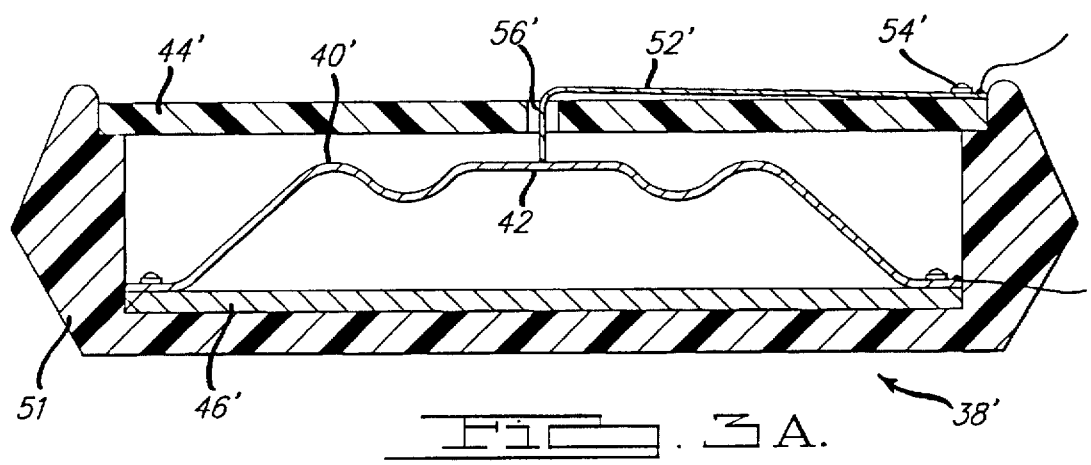
FIG. 3A is a front elevational view in partial cross-section of a first sylfone embodiment shown in FIG. 2.
Figure 3B:
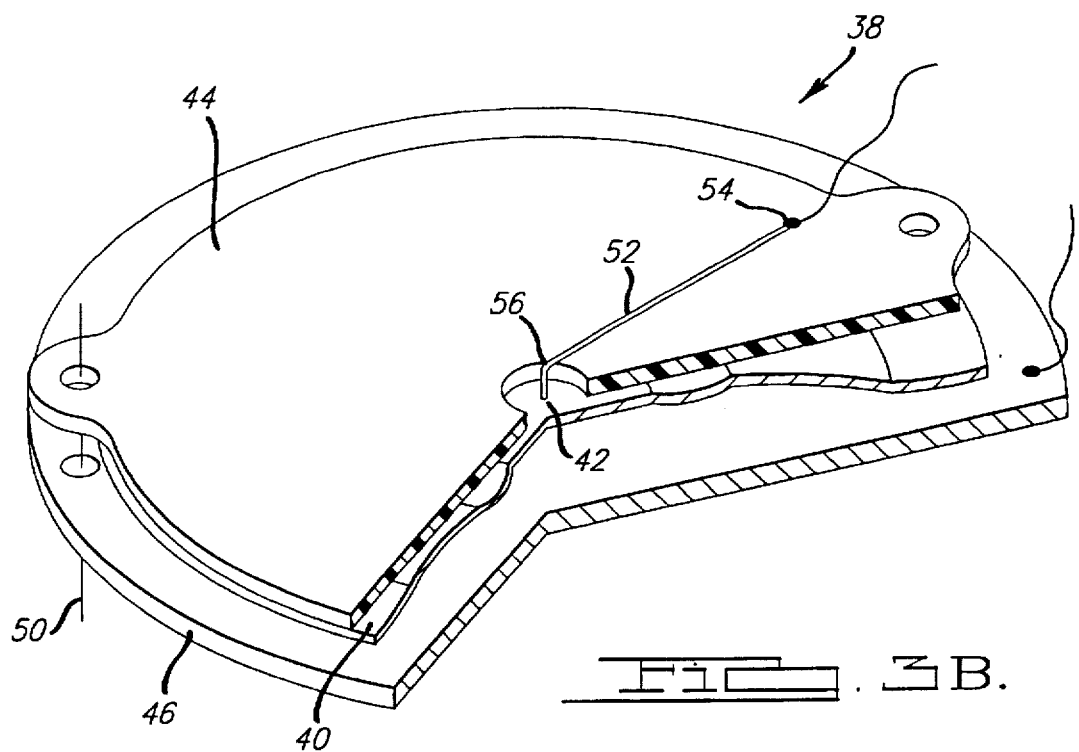
FIG. 3B is a cross-sectional view of a second alternative sylfone embodiment.

Referring now to FIG. 3B, the structure of a first switching element 38 is shown in detail. The sylfone 40 is integrally covered and hermetically sealed between the cover 44 and the base 46. Preferably, the sylfone consists of a thin metal membrane that is welded to the base 46 and includes and defines an internal space within the membrane that is hermetically isolated from the external air. Several spacers 50 are secured to the base 46. The cover 44 is mounted onto the spacers 50 on top of the sylfone 40.

Referring in particular to the cover 44, an electrically conductive spring 52 is secured within the cover at a first end 54 and selectively creates an electrical contact with the surface of the sylfone membrane 40 through a non-secured second end 56. The spring 52 is preferably composed of steel wire of approximately 0.2 millimeters in diameter and closes the switching element 38 when the internal tire pressure reaches a predetermined value. In one embodiment of the present invention, under normal atmospheric pressure, the spring 52 completes a circuit within the switching element 38. Completion of the circuit within the switching element completes the circuit 32 and activates the circuit 32. Thus, when mounted inside one of the tires 16a–d, the status of the switching element 38 is dependent on the internal tire pressure. If the internal tire pressure is at or near normal operating pressure, such as 30 pounds per square inch (psi), the sylfone surface is compressed, causing the contact assembly 42 to remain open. However, when the internal tire pressure is reduced to a value such as, for example, less than 15 psi, the sylfone membrane is decompressed, causing the spring non-secured end 56 to contact the sylfone membrane and close the circuit within the contact assembly, thereby causing the contact assembly to complete the circuit 32.

Referring to FIG. 3A, a second alternative switching element is shown at 38'. The switching element 38' includes many of the same components contained in the switching element 38, and further includes a non-conductive housing 51 separating the cover 44' and the base 46'. Otherwise, its structure and function is similar to the switching element 38. Thus, it should be appreciated that the switching element may be constructed in a variety of configurations without departing from the scope of the present invention.

The circuit 32 preferably is constructed from a thin metal foil that forms an open ring. The foil represents a contour with distributed characteristics, including the inductor 34 and the capacitor 36. Each end of the ring is soldered directly to the switching element 38. This particular circuit design thereby minimizes production costs without sacrificing system performance characteristics.

Figure 4:
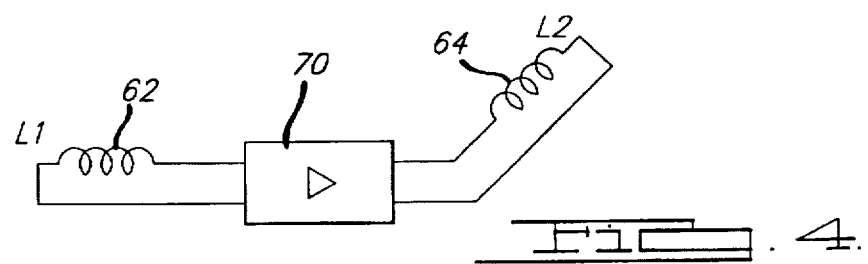
FIG. 4 is a simplified electrical schematic diagram of the receiver of the system shown in FIG. 1.
Figures 5, 6:
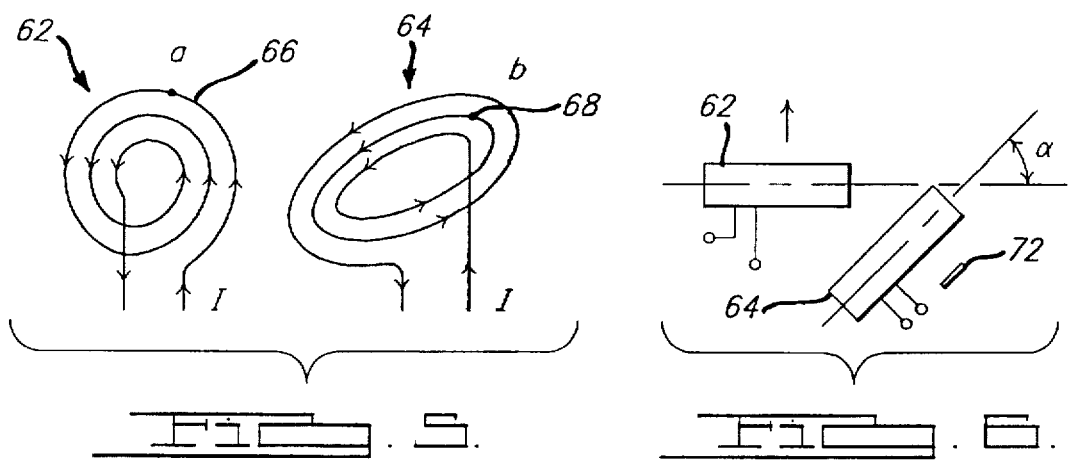
FIG. 5 is an electrical schematic diagram illustrating the electromagnetic flux generated by the two conductor coils shown in FIG. 4.
FIG. 6 is a schematic diagram illustrating the positioning of the two inductor coils shown in FIG. 4.

Still referring to FIGS. 2, 4 and 5, the structure of the receiver 20a will now be described in detail, with it being understood that the structure and function of the receivers 20b–d are identical. The receiver 20a is powered by a motor vehicle battery 60 when the engine of the motor vehicle is running. The receiver 20a includes inductors 62, 64 (FIG. 4) which are preferably coils, each having a plurality of turns 66, 68 (FIG. 5), and an amplifier 70 (FIG. 4) which together form an oscillator having parameters that depend upon the mutual orientation of the inductors 62, 64. Referring to FIG. 5, upon being energized by the motor vehicle battery, each element 66 of the inductor 62 interacts with an opposing flux generated by current in the inductor 64. Also, each element 68 of the inductor 64 interacts with an opposing flux generated by current flow in the inductor 62. By being connected to the constant gain amplifier 70 (FIG. 4), the inductors, through mutual interaction between coils can be adjusted to exhibit positive, negative or zero feedback characteristics.

Figure 7:
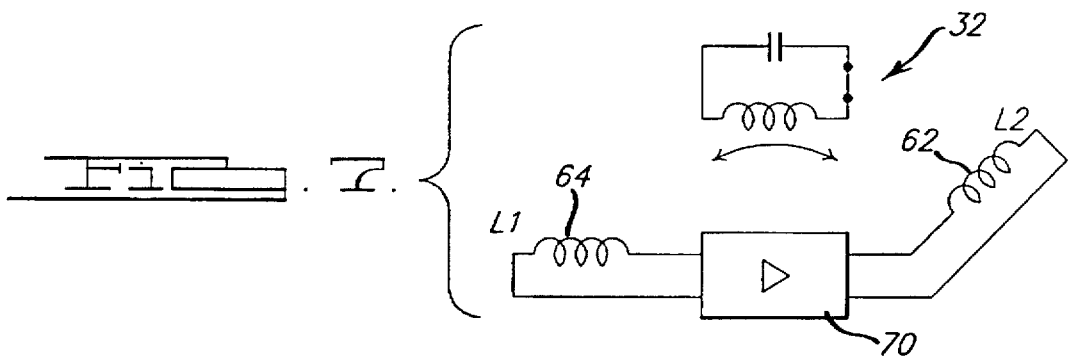
FIG. 7 is a simplified electrical schematic diagram illustrating the effect of the sensor on the receiver when the sensor is rotated into operative proximity with the receiver.

Referring to FIG. 6, because the overall net effect of the feedback, whether it is positive, negative or zero, depends upon the mutual orientation and configuration of the inductors 62, 64, the type of feedback desired is adjusted by changing the angle of orientation between the coils during mounting of the coils to the motor vehicle drivetrain. The inductors 62, 64 are secured to the drivetrain at an angle a as shown in FIG. 6 in conjunction with a tuning mechanism 72 placed between the inductors and the transducer. The tuning mechanism, which is preferably a small piece of foil, allows fine tuning of the inductors, by securing the foil toward the coil 64 or away from it prior to the inductors being permanently secured in place. The inductors are permanently secured in a specific position after alignment and turning of the inductors. Preferably, the circuit feedback is adjusted to equal zero or to be slightly negative so that there is no self-oscillation of the circuitry, thereby placing the circuitry in a relaxation stage. The feedback characteristics of the circuit are subsequently changed upon the rotation of the sensor transducer into operative proximity to the receiver as shown at 78 in FIG. 7, and as will be described in detail below.

Referring again to FIG. 1, each receiver is connected to an LED indicator interface 80 through wiring, or, alternatively, through a wireless communication link. The indicator interface 80 is preferably located within the passenger compartment of the motor vehicle and displays the current status of each of the vehicle tires to the motor vehicle operator. Preferably, the LED indicator includes four light emitting diodes (LEDs) 83a–d (see FIG. 10), with each LED being associated with a particular tire. More LEDs may be utilized for vehicles having more than four wheels. The indicator interface may be mounted inside the front dashboard of the motor vehicle, or on the dashboard, for easy observation. Preferably, each LED is only illuminated upon the internal pressure of a particular tire either rising above a maximum acceptable tire pressure or falling below a minimum acceptable tire pressure.

Figure 8:
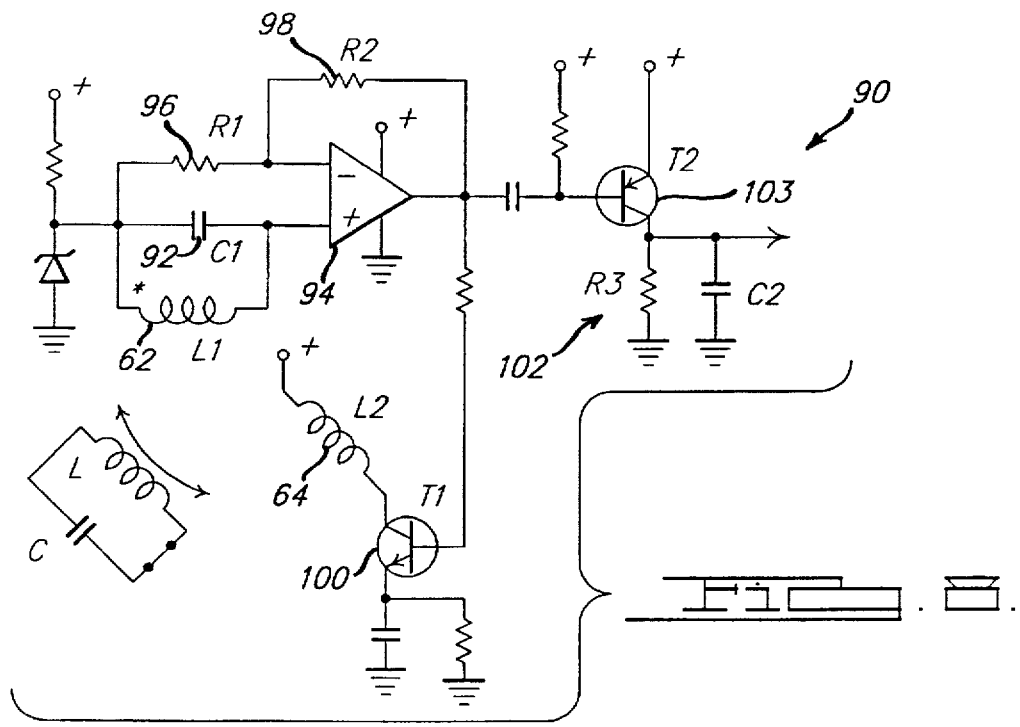
FIG. 8 is a detailed electrical schematic diagram of the receiver and sensor of the present invention illustrating the receiver in additional detail.

Referring to the receiver, an electrical schematic diagram of each receiver is shown generally at 90 in FIG. 8. Inductor 62 and an input capacitor 92 form an input contour calibrated for greater sensitivity to the resonant frequency of the sensor transducer located in each tire. An operational amplifier 94 is utilized for signal amplification, and has a gain calibrated by resistors 96, 98. Additional current amplification is performed by the transistor 100 for additional amplification that is required to obtain total gain of the receiver. In particular, an output signal taken from the collector of transistor $T_2$ of the receiver can be adjusted to have zero output when mutual displacement of coils $L_1$ and $L_2$ is said to have zero feedback. By displacing these coils in either direction from each other, either negative or positive feedback can be achieved. In case of positive feedback, an output from the receiver will be present. In case of negative feedback, the output is still equal to zero. In general, the output from the operational amplifier is greater than "1" when the following condition is met:

$K\beta > 1$, where $K = K_1 \times K_2$ $K_1$ = gain of operational amplifier $K_2$ = the gain of transistor 100 (FIG. 8)

$\beta$ = mutual coefficient of inductors 62, 64

The variable $\beta$ depends on displacement of the inductors 62, 64, number of turns and their shape (size).

For final adjustment when K is constant $\beta$ is adjusted in such a way that $K\beta \leq 1$ by adjusting the mutual displacement of the inductors.

Also, a cascade amplifier 102 formed by a transistor 103 operates as a pulse detector for the operational amplifier 94. Other components shown are required for DC calibration of the circuit.

Referring to FIG. 10, an electrical schematic diagram of a preferred LED interface 80 is shown. The interface preferably consists of four NAND logic gates 104a–d which are driven by first inputs 106a–d each connected to the output of a receiver corresponding to a particular tire. Second inputs 108a–d are connected to a free running oscillator 110. The oscillator 110 outputs a rectangular shape voltage having a frequency of, for example, 0.33 to 0.50 hertz. Thus, when internal pressure in each of the tires is near the normal operating pressure, all inputs to the NAND logic gates 104a–d will be a logical "0". As a result, all outputs of buffer inverters 112a–d, each of which is connected to an output of one of the NAND gates, will also have a logical "0" as an output. Under these conditions, all LEDs 83a–d in the display will be illuminated. The LED interface also preferably includes an audible warning component having a counter 114 and associated transistor 115, a second oscillator 116 that functions as a pulse generator, and two inverters 117, 118 that couple the oscillator to an audible warning device such as the buzzer 119.

Operation of the TPMS according to the first preferred embodiment of the present invention will now be described. The theory of operation of the TPMS of the present invention is based on the principle of mutual interference that is created between the two electromagnetic fields formed by the inductors 62, 64 in the receiver, and the electromagnetic field formed by the circuit 32 in the sensor transducer mounted within each of the tires. Thus, when the circuit 32 is closed and activated in response to sensed tire pressure, and the circuit is rotated into operative proximity to the inductors 62, 64 of the receiver, the receiver oscillates at a frequency dependent on the self-resonant frequency to which the circuit is adjusted. The sign of the feedback between the inductors 62, 64 is subsequently changed from negative to positive. It should be appreciated that the shape and the amplitude of the oscillation depends upon the degree of feedback, the configuration of the inductor coils, and the gain of the amplifier 70 (FIG. 4).

Figure 9A:
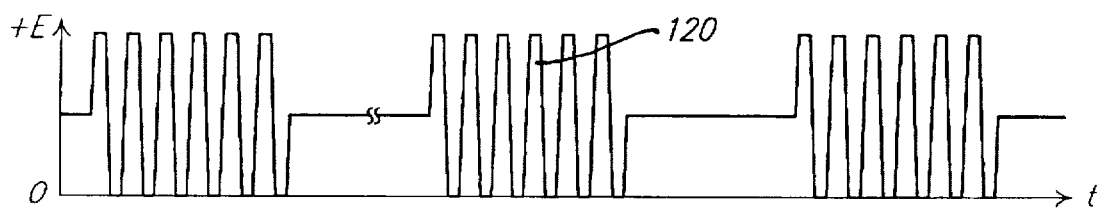
FIGS. 9A and 9B are graphs illustrating the voltage output from the operational amplifier and the detector shown in FIG. 8 versus time.
Figure 9B:
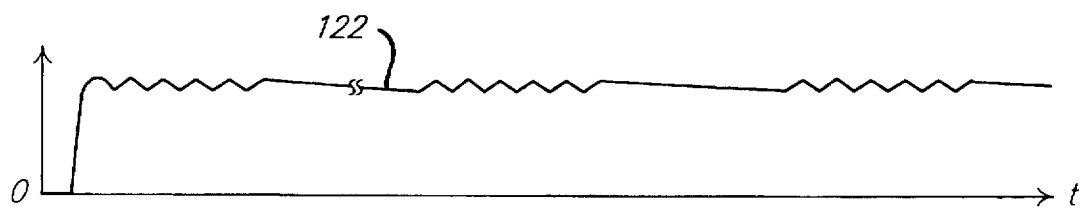

When the circuit rotates into operative proximity to the receiver as the tire rotates and the circuit 32 is open loop, or non-conductive, oscillation does not occur as the passive circuit is not activated. When the circuit is conductive, or the circuit loop closed, the operational amplifier 70 produces an oscillating output voltage when all inductors 34, 62, and 64 are aligned. This oscillating voltage has a frequency equal to the self resonant frequency of the circuit 32. The operational amplifier voltage is graphically illustrated at 120 in FIG. 9A, while the receiver output voltage is graphically illustrated at 122 in FIG. 9B.

Referring again to FIG. 10, operation of the TPMS will be described by way of example. When the internal pressure of a tire, such as the tire 16a, drops below a minimum acceptable level, and the switching element 38 closes, a logical "1" is output from the receiver and input through the NAND gate input 106a. The logical "1" input causes the LED 83a to blink at a rate equal to the frequency of the oscillator 110.

The second oscillator 116 may also be utilized such that when the logical "1" is input at input 106a, the input enables the oscillator 116 to produce pulses with an audio frequency. These pulses are fed through the two inverters 117, 118 to the circuit output to generate an audible alarm signal, such as that generated by the buzzer 119.

Simultaneous to the blinking of the LED and the buzzing of the buzzer, the counter 114 is enabled and counts pulses coming from the generator 116. When the counter counts 2n−1 pulses, its 2n output becomes a logical "1". The logical "1" output from the counter 114 is input into the transistor 115, which subsequently becomes conductive and shunts the output of the inverter 118, thereby disabling the audible alarm signal from the buzzer 119. The 2n output is also connected to the EN input of the counter to disable further counting of the counter. Thus, only a continuous blinking of the corresponding LED will notify the driver that the internal pressure of the tire 16a has reached an unacceptable level. The combination of the audible and visual warnings will repeat itself each time the car engine is started, with the audible alarm being disabled after a predetermined time by the counter as described above.

Referring now to FIGS. 11 through 17, a second preferred embodiment of the present invention will now be described that provides continuous monitoring of the air pressure in the tires of a motor vehicle, with a highly accurate digital readout of the actual tire pressure within each of the tires. This second embodiment is similar in structure and function to the first embodiment described above, with the following differences.

Figure 11A:
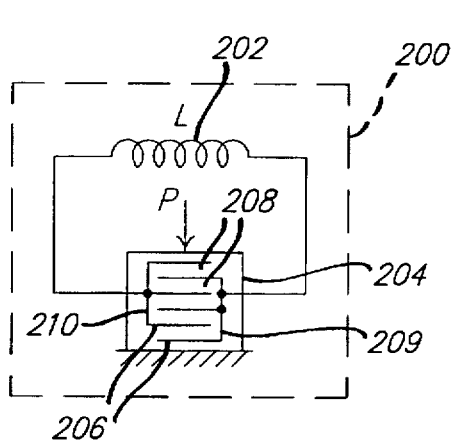
FIGS. 11A and 11B illustrate alternate embodiments of a sensor including a pressure sensitive capacitor of a system according to a second preferred embodiment of the present invention.
Figure 11B:
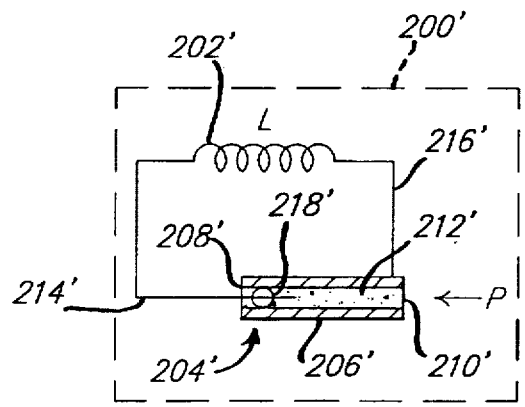

Referring to FIGS. 11A and 11B, a sensor transducer according to the second preferred embodiment is mounted within each of the tires 16a–16d and is shown generally at 200. The sensor transducer 200 is mounted inside the tire as described above and includes an inductor 202 similar in structure and function to the inductor of the sensor transducers 14a–d (FIG. 1) described above. However, the capacitor 204 differs from the capacitor of the sensor transducers 14a–d in that it is constructed to produce a ratio proportional to the internal pressure of the tires according to the following relationship:

$$C = f(P)$$

where C is capacitance; and P is internal tire pressure.

Referring to FIG. 11A, the capacitor 204 is constructed from a thin metal foil 206 including a dielectric member 208. The dielectric member 208 is constructed from a resilient material such as rigid rubber that has insignificant after-response deflection characteristics. Thus, the dielectric member, upon being deformed, returns to its non-deformed state and shape.

The capacitor 204 includes a first side 209 that, along with the inductor 202, is secured to the inside tire wall through vulcanization as described above. A second side 210 of the capacitor is highly sensitive to the internal tire pressure. The capacitor is compressed as internal tire pressure increases, causing the dielectric member 208 to compress. As the dielectric member is compressed, the value of the capacitance increases. Conversely, as the internal tire pressure decreases, the dielectric member decompresses, thereby increasing the distance between the capacitor sides 209 and 210 and thus decreasing capacitance.

FIG. 11B shows an alternative construction of a sensor transducer at 200'. The sensor transducer 200' includes a capacitor 204', which is a thin wall cylindrical capacitor that consists of a cylindrical vessel 206' made from a strong dielectric material, such as nylon coated with conductive film. A first end 208' of the cylinder is hermetically isolated from the air in the tire. A second end of the cylinder 210' is open to the tire air pressure. The cylindrical vessel 206' is filled with a paste 212' or, alternatively, with a non-disbursing high density oil, either of which is electrically conductive. If the conductive paste is used, the paste should have sufficient inter-molecular forces to avoid dispersion of the paste due to tire rotation. The capacitor includes a first lead 214' connecting the first end of the capacitor to the circuit, and a second lead 216' that consists of a thin layer of conductive metal deposited on the cylindrical surface of the vessel to connect the second end to the circuit. Air pressure within the tire penetrates through the vessel opening 210' and displaces the paste 212' to compress a small amount of air 218' within the cylinder thereby varying the capacitance of the capacitor accordingly. The resonant frequency of the sensor transducer 200' is thus proportional to the air pressure inside of the tire.

Figure 12B:
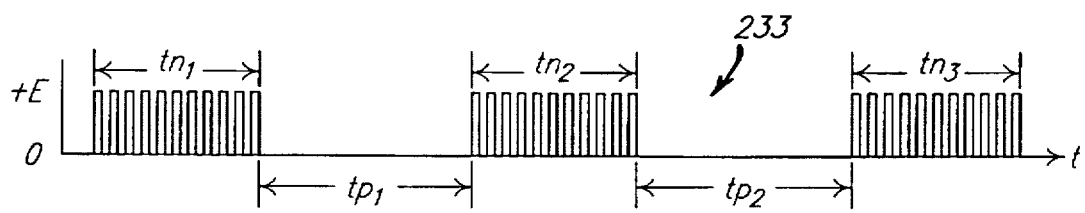
FIG. 12B graphically illustrates the voltage output of the receiver of FIG. 12A.
Figure 12A:
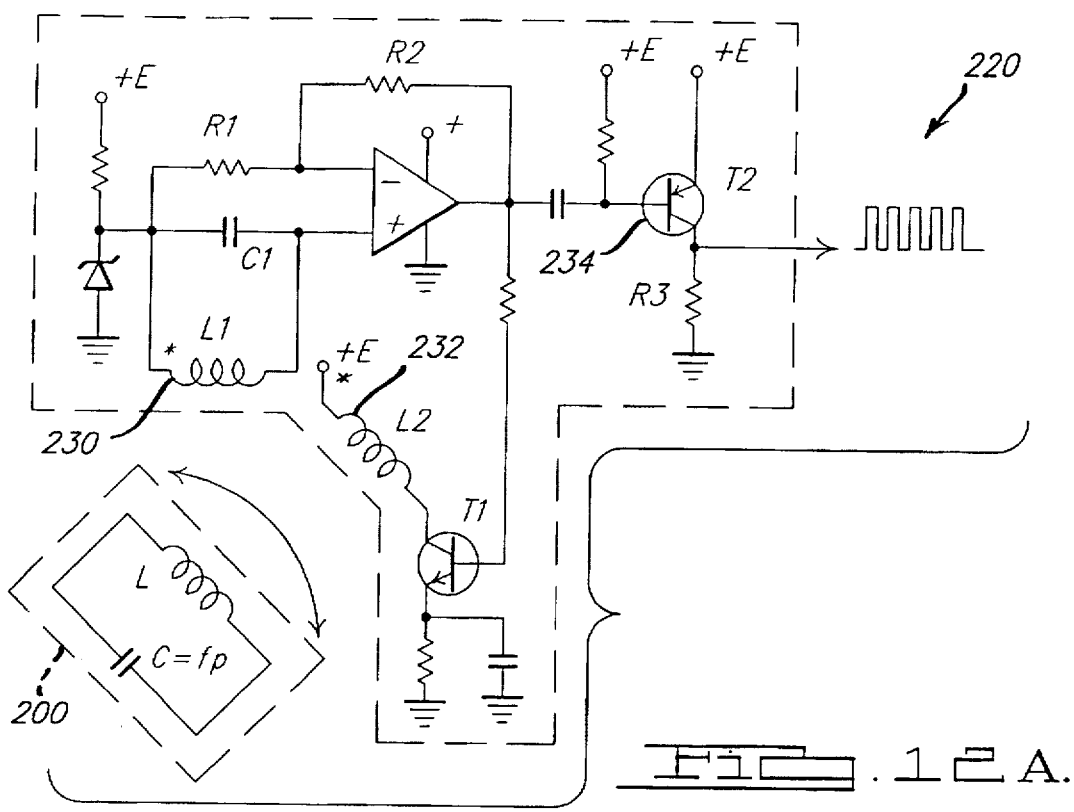
FIG. 12A is an electrical schematic diagram of the receiver of the system according to a second preferred embodiment of the present invention.

Referring to FIGS. 12A–12B, an electrical schematic diagram of a receiver that works in conjunction with the transducer 200' is shown at 220. When a tire rotates, the passive sensor transducer 200 creates an unbalanced electrical field between inductors 230 and 232 of the receiver 220 that is a function of the air pressure inside the tire. The receiver 220 is permanently secured on the wheel axle as shown in the FIG. 1 in close proximity to the tire wall. When the transducer 200 acts upon the inductors on each rotation of the tire, a train of rectangular pulses having a frequency equal to the resonant frequency of the contour of the circuit 200 will be developed as shown at 233 in FIG. 12B. The duration of each train of pulses tn1, tn2, tn3, etc., varies with the vehicle speed.

Referring to FIG. 12A, the physical structure principle behind the transducer receiver interaction has been described above in detail. The only difference between the first and second embodiments is that a transistor 234 (FIG. 12A) operates as a current switch by generating strong current pulses into the LED interface. All other circuit components of the receiver 220 are identical to those in the receiver described in conjunction with the first preferred embodiment described above.

As has been discussed, the frequency of oscillation at the output of the receiver 220 equals the resonant frequency of the transducer contour as is shown at 233 in FIG. 12B.

Figure 13:
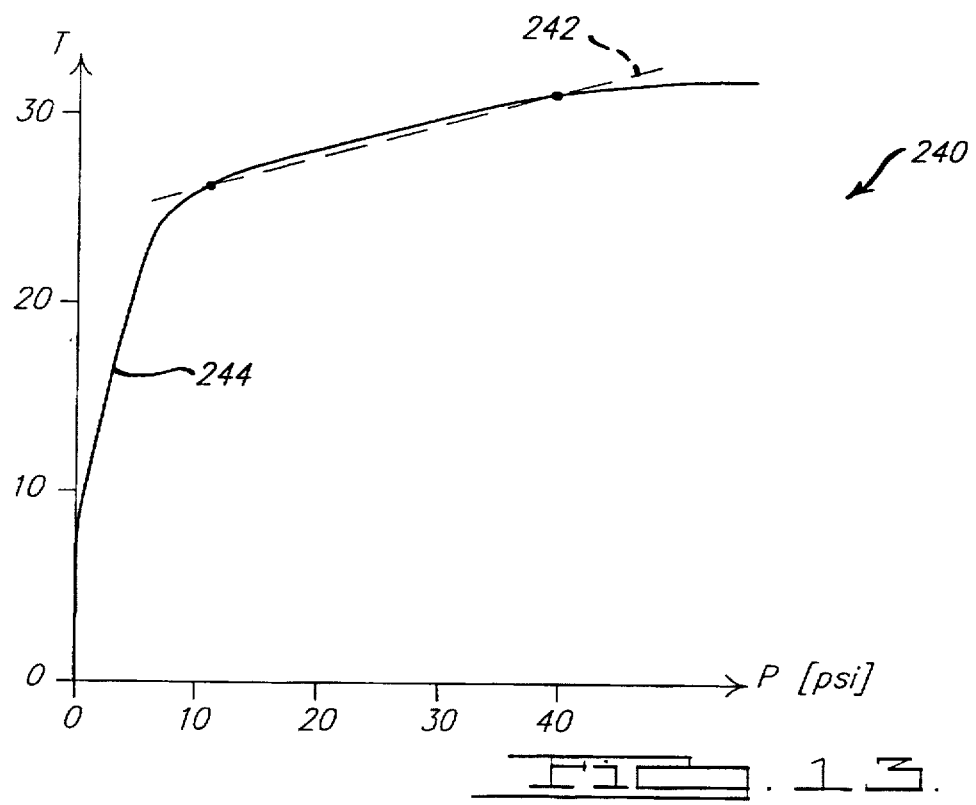
FIG. 13 graphically illustrates a period T of oscillation at the output of the receiver shown in FIG. 12A versus internal tire pressure under the constant value of the inductance of the receiver.

FIG. 13 displays at 240 a relationship between a period of oscillation T at the output of the receiver 220 and a pressure inside the tire under the constant value of the inductor 202 (FIGS. 11A, 11B). The curve is non-linear in a wide range of the pressure changes. However, within a working range from 15 to 40 psi this curve is relatively linear with only 5% tolerance. The dashed line 242 provides a theoretically linear characteristic compared to actual response shown at 244.

Figure 14:
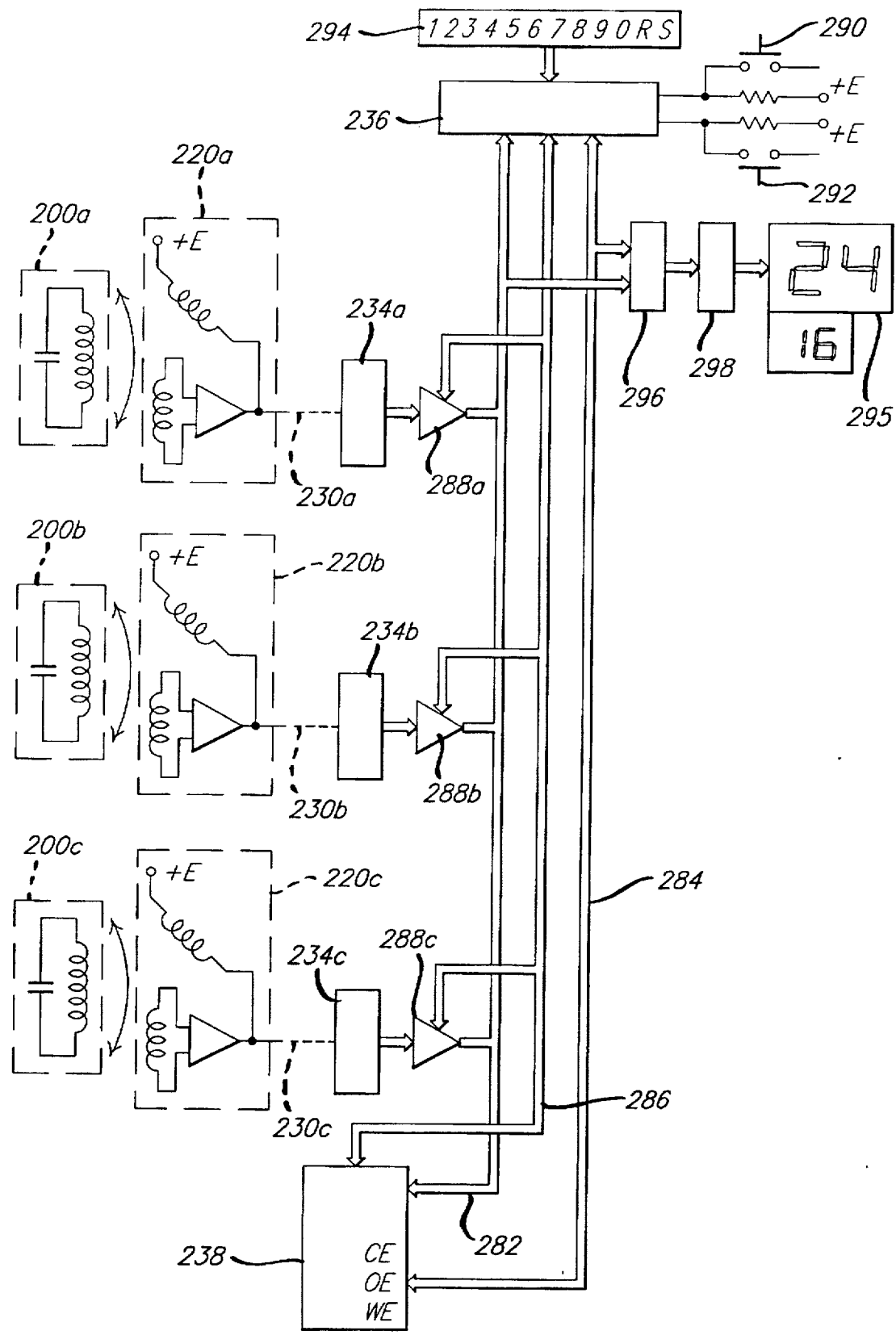
FIG. 14 is an electrical schematic diagram illustrating the measurement and display features of the system according to the second preferred embodiment of the present invention.

FIG. 14 is a functional overall system diagram illustrating control, measure and display of the current tire pressure in each tire. While only three sets are shown for illustrative purposes only, while four sets of sensor transducers and receivers are typically utilized, one set for each wheel. Sensor transducers 200a–c are coupled with corresponding receivers 220a–c. When the tires rotate, the coupling between the transducers and the receivers produces a train of pulses at the output of the receivers as shown in the FIG. 12b. The duration of the pulse period at the output 230a of the first receiver 220a is determined by the resonant frequency $f_{p1}$ of the contour in the transducers as follows:

$$T_1 = \frac{1}{f_{p1}},$$

Duration of the pulse period at the output 230b of the second receiver is determined by the resonant frequency $f_{p2}$ of the contour located in the second transducer 200b:

$$T_2 = \frac{1}{f_{p2}}, \text{etc.}$$

All receiver outputs 230a–c in FIG. 14 are wired to inputs 232a–c of A/D converter blocks 234a–c. The A/D converter blocks transform the time interval, that is proportional to one or several periods, into a serial string of discrete data that can be read by a microprocessor 236. This string of data is stored in a memory chip 238 until a new string of data generated from a second turn of the same tire replaces the first stored string of data. All converter blocks work in the same manner. As a final result, a value of the current tire pressure is stored at the output of each A/D converter block.

Figure 15:
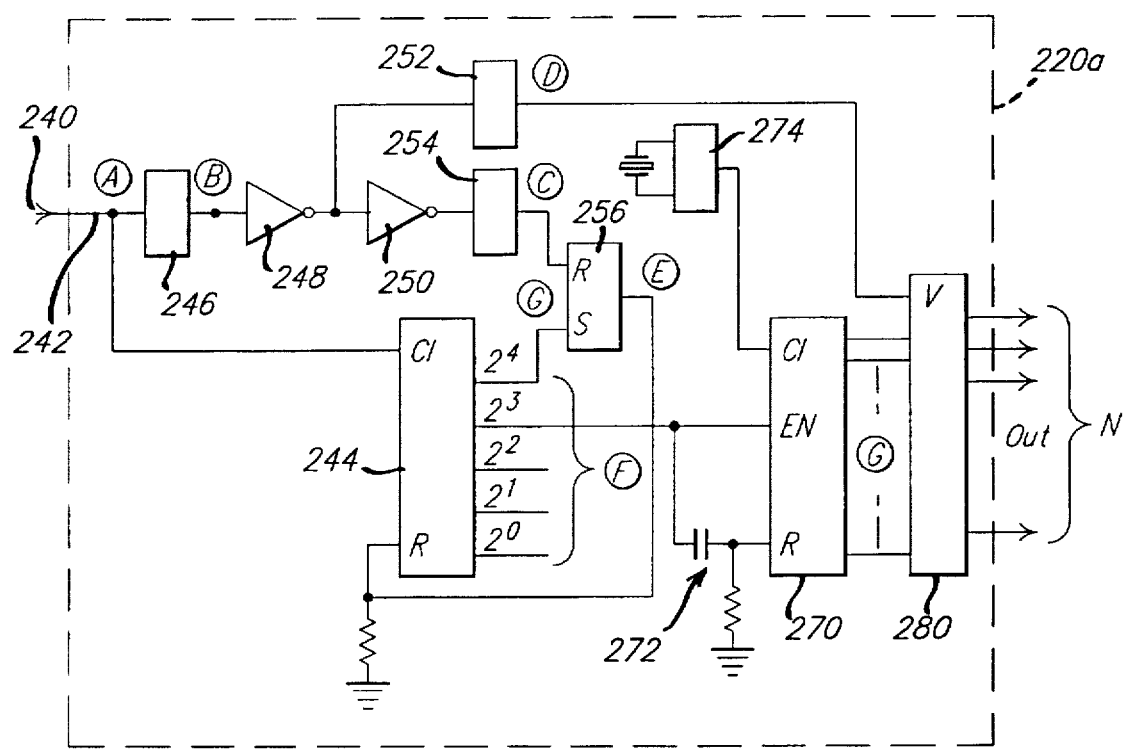
FIG. 15 illustrates a functional electrical schematic diagram of the converter block shown in FIG. 14.

FIG. 15 shows a functional block diagram of, for example, the A/D converter 220a shown in FIG. 14. Generally, the A/D converter includes an input 240 and a detector input 242. Both a counter 244 and an amplifier are connected to the peak-detector 246 at the input 242. Two signal inverters 248, 250 are coupled to the differential networks amplifier 252 and 254. An output from differential network 252 is connected to an enable output of a storage register 280. When the last train of pulses is detected at the output of inverter 248, the output records the train pulses into the storage register 280. The output of the amplifier 254 is coupled to an input of an RS trigger 256, which in turn reset the counter 244 upon the occurrence of predetermined conditions described below. A second counter 270 is coupled to both the first counter and to a quartz generator and is operative to selectively enable an input to the register 280, as will be described in more detail below.

Figure 16:
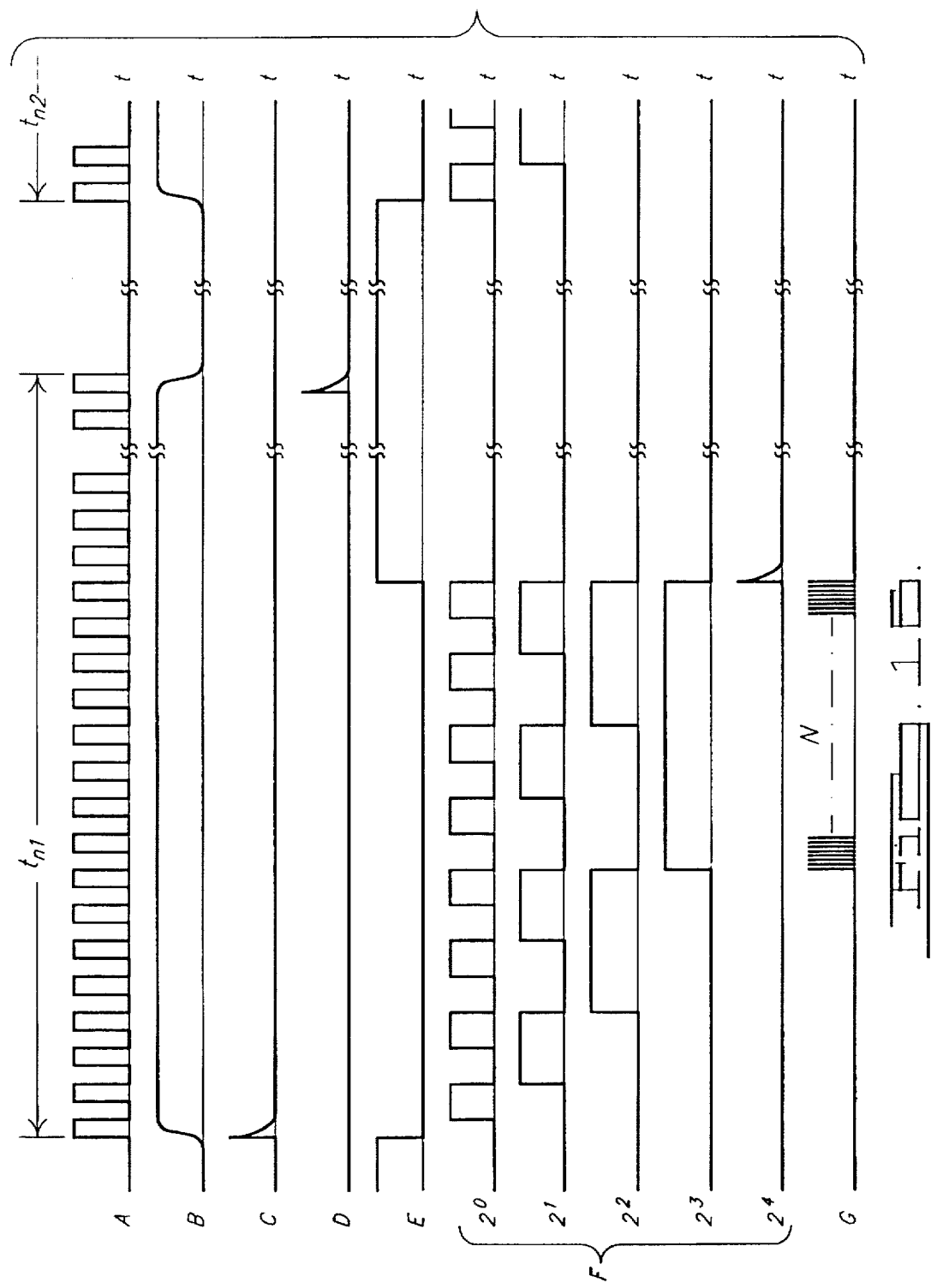
FIG. 16 is a histogram of voltages measured at different points in the circuit of FIG. 15.

FIG. 16 shows a histogram of voltages measured in different points of the system. A train of pulses with duration of $t_n$ is fed into the A/D converter input 240. The shape of the signals at the input of the A/D converter is shown at A in both FIGS. 15 and 16. These signals are fed into the input of the detector 242 and into input "CI" (clock) of the first counter 244, with the detector input voltage being represented at B in FIGS. 15 and 16. After the signals have been amplified by the peak-detector 246 and shaped by two inverters 248, 250, the front edge of the pulses are differentiated by differential networks 252, 254. The output from the differential network 252 is fed into the trigger 256 resetting it to logic "0". The output voltage from the trigger 256 is shown in FIG. 16 at E. As soon as the output of the trigger becomes "0", the first counter 244 starts counting pulses that arrive from the receiver 220a.

Voltage histograms of all output registers of the counter 244, that is $2^0, 2^1, 2^2, 2^3, 2^4$, are shown at F in FIG. 16. The voltage from output $2^3$ of the first counter is fed into an "enable" input of the second counter 270. Simultaneously, the front edge of the pulse that is fed into the second counter that is fed into the second input "R" of the counter is differentiated by the RC network 272. The front edge of the incoming pulse resets all output registers of the second counter to "0". At the same time, input "CI" of the second counter 270 is fed from the quartz generator 274 and starts counting pulses.

The counting of these pulses is shown at G in FIG. 16 and continues until the "enable" input of second counter receives a logic "1". As soon as a logic "0" at the output $2^3$ of the second counter is registered, the counter stops counting. At the same time when a logic "1" is registered at the $2^4$ output of the first counter, the RS-trigger becomes reset, that is when its output "E" becomes "0", it resets all outputs of the first counter to "0".

The number of pulses, shown at G in FIG. 16, from the quartz generator 274, counted by the second counter remains intact until a second train of pulses arrives from the receiver 220a. This train of pulses has a duration of $t_{n2}$. At the end of the first train of pulses from the receiver, a falling edge of the pulse at the input of the detector 200a is differentiated by the differential amplifier 254. This pulse, which is graphically illustrated at D in FIG. 16, makes a "write" command of all outputs from the counter 270 to the output register 280. When the second train of pulses is registered at the input of the inverter block with duration $t_{n2}$, the above mentioned sequence repeats.

As can be appreciated from the foregoing description, the inverter block from every train of pulses arriving from the receiver forms a time interval such as the time interval F from the $2^3$ output of the first counter, which is equal to eight periods of the input frequency of the receiver 220a. Subsequently, the inverter modifies the time interval at the output $2^3$ into a binary code "N" that is proportional to the formatted pulse duration. This code is stored in the output register 280. In general terms, in order to increase the accuracy, this conversion can be performed with a random selected time interval that is a product of n-pulses of the input frequency. An increased accuracy and reduced tolerance can be achieved by either increasing the duration of the formed time interval or by increasing the frequency of the quartz generator that fills the time interval.

Referring again to FIG. 14, digital data taken from the outputs of the inverters is processed by the microprocessor 236. The microprocessor 236 is connected to the programmable memory 238, by means of a data-bus 282, address-bus 284 and a control-bus 286. The control-bus is used to send control commands of synchronization and direction of the control flow to all parts of the circuitry shown in FIG. 14. Buffer amplifiers 288a–c are utilized and are necessary for increasing the load capacity of the inverters. The control-bus may be also required to have buffer amplifiers (not shown). All buffer amplifiers are equipped with "three-state" outputs.

The memory block 238 is programmable through a "write" command button 290, and an "erase" command button 292. Both buttons are located next to the touch-screen display 294, which is capable of displaying digits from 0 to 9 and which includes a reset button and a set button (not shown). The interface is capable of displaying the pressure in any tire, such as 24 psi in the front right-hand tire 16a, 295 or for any particular tire such as the tire identified as tire #16 at 295 in the case of a tractor-trailer. The interface touch-screen display is connected to the data-bus 282 and to the control-bus 286 through an analyzer 296 and a digital interface driver 298.

When a motor vehicle is initially equipped with the TPMS, an initial setup of the pressure monitor system by the driver can be performed as follows.

Figure 17:
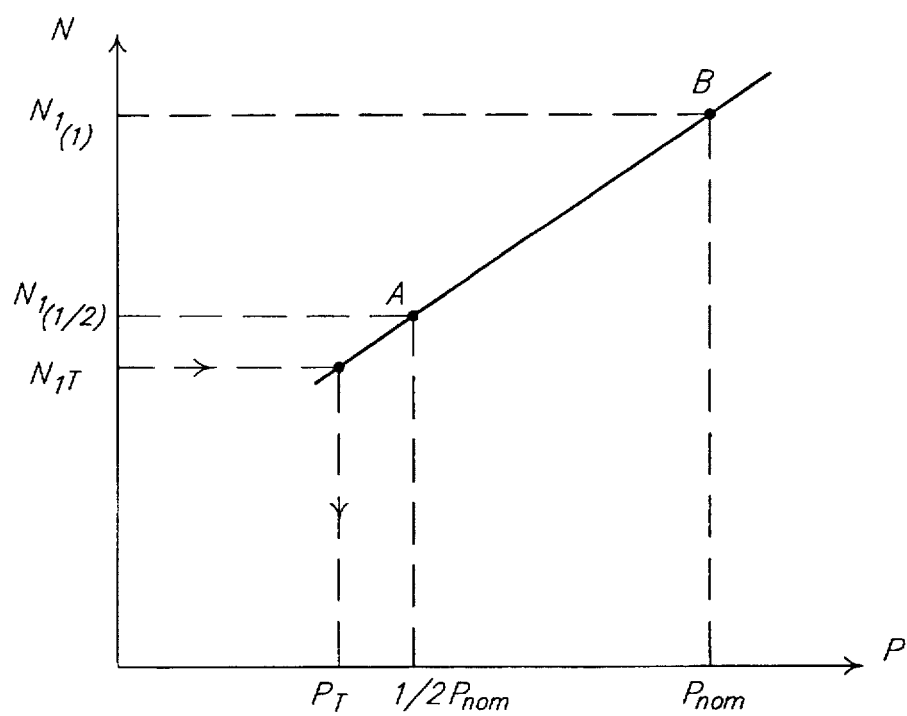
FIG. 17 is a graph illustrating recorded values of pressure within the tire stored in the memory of the processor utilized with the system of the present invention.

First, each tire is inflated to ½ of its rated pressure. Next, the driver activates the display interface by touching the number on the display that corresponds to the tire number being selected for the setup. After the delay interface is activated, the driver activates the set button to generate a "write" command. In this case the microprocessor selects an appropriate bus and makes a recording of the code arriving from the inverter to the memory. For example, the first recording of ½ inflated tire pressure information is A, as shown in FIG. 17, with a value $N_{1(\frac{1}{2})}$.

Subsequently, the tire is inflated to its rated pressure and a new value of the air pressure is recorded into address B. When both the ½ inflated and full rated pressure in all tires have been recorded, pressure valves are stored in the memory for each tire of the vehicle. These values correspond to ½ of the rated pressure shown as ½ P and $P_{nom}$ in FIG. 17 at points A and B with the coordinates being $N_{1(\frac{1}{2})}$, ½ $P_{nom}$ for point A and the coordinates being $N_{1(1)}$, $P_{nom}$ for point B.

When the vehicle is in motion and the tires are rotating, the microprocessor operates as follows. First, a clock pulse (not shown in FIG. 14) generates a "read" command from the first A/D converter block and makes a "write" command of the obtained code to the internal memory of the microprocessor. Next, the microprocessor makes a comparison of the current value of the code with the code $N_{1(\frac{1}{2})}$. If result of the comparison is less than the stored one then the processor displays a tire number, and its air pressure. This value (Nt, the current value) is calculated by the microprocessor by way of linear interpolation between the two known points as shown in FIG. 17. When the result of the comparison is greater than the one that has been stored in the memory, then no warning will be displayed on the operator interface. Other tires are scanned in the same manner.

As soon as all values of the current pressure in each tire are recorded after each turn of the tires, the continuous pressure indication on the operator interface will take place. This is the most important in case of deflated tires when a close monitoring of the pressure is highly critical for the safety of the driver. Even if air pressure in every tire is normal, the driver is capable of monitoring the pressure in any tire. It may be required, for instance, when driver wants to know the status of tire pressure before driving a car. The only thing he has to do is to press "Set" button on the touch-screen, and the display will show the tire number and its pressure, one at a time.

By selecting any specific tire, by pressing its number, the driver can display the air pressure in that tire. The "Reset" button is required for the initial setting of the operator interface by placing it into automatic mode of control and monitoring. The microprocessor also allows the receivers to be tuned automatically.

While the above detailed description describes the preferred embodiment of the present invention, the invention is susceptible to modification, variation and alteration without deviating from the scope and fair meaning of the subjoined claims.

What is claimed is:

1. A tire pressure monitoring system, comprising:
   a sensor mounted within a tire that triggers a signal when tire pressure reaches a level outside predetermined parameters;
   a receiver mounted in operative proximity to said sensor at a location outside of said tire, said receiver being electromagnetically coupled to said sensor when said sensor is activated in response to said tire pressure reaching the level outside predetermined parameters, said receiver including at least a first inductor and a second inductor, said first inductor and said second inductor being positioned relative to one another so that upon creating an electromagnetic coupling between said first inductor and said second inductor, feedback from said coupling is one of either a substantially zero feedback and a negative feedback; and
   an indicator coupled to said receiver that generates a signal when said tire pressure reaches the level outside predetermined parameters.

2. The system of claim 1, wherein said sensor comprises a passive inductor/capacitor (LC) circuit.

3. The system of claim 2, wherein said passive LC circuit is in a conductive state when said tire pressure falls outside said predetermined parameters and is in a non-conductive state when said tire pressure falls within said predetermined parameters.

4. The system of claim 3, wherein said sensor triggers an electromagnetic coupling with said receiver when said sensor is in a conductive state.

5. The system of claim 1, wherein said sensor includes a switch for switching said sensor between conductive and non-conductive states.

6. The system of claim 5, wherein said switch comprises a sylfone switch.

7. The system of claim 6, wherein said sylfone comprises a surface membrane including a internal space isolated from air within said tire, and an electrically conductive spring operatively associated with said surface membrane for selectively contacting said membrane when said tire pressure falls outside said predetermined parameters.

8. The system of claim 1, wherein said first and second inductors, when energized, form an oscillating output with a frequency dependent on a resonant frequency of said sensor when said sensor is located in proximity to said receiver.

9. The system of claim 1, further comprising a power source for providing power to said receiver.

10. The system of claim 1, wherein said indicator comprises an LED interface for visually indicating when said tire pressure falls outside said predetermined parameters.

11. The system of claim 10, wherein said LED interface includes at least one NAND gate having a first input coupled to said receiver and a second input coupled to an audio oscillator for enabling said LED and an output coupled to an LED that is illuminated when said tire pressure falls outside said predetermined parameters.

12. The system of claim 1, wherein said indicator comprises an audio indicator for audibly indicating tire pressure warning when said tire pressure falls outside said predetermined parameters.

13. The system of claim 12, wherein said audio indicator is disabled after a predetermined period of time.

14. The system of claim 1, wherein said receiver further comprises an operational amplifier coupled to said first and second inductors to form a pulse generator when said sensor is within close proximity to said receiver and is conductive; and
   a current amplifier for amplifying current input to said receiver to achieve required current amplification of said second inductor.

15. The system of claim 1, further comprising an analog-to-digital converter coupled to said receiver output for converting signals from said receiver to digital signals.

16. A tire pressure monitoring system, comprising:
   a sensor mounted within a tire that triggers a signal when tire pressure reaches a level outside predetermined parameters;
   a receiver mounted in operative proximity to said sensor at a location outside of said tire, said receiver being electromagnetically coupled to said sensor when said sensor is activated in response to said tire pressure reaching the level outside predetermined parameters, wherein said sensor reverses a sign of a feedback in said receiver when said sensor becomes conductive and is placed in an interference location with respect to a first inductor and a second inductor positioned within said receiver; and
   an indicator coupled to said receiver that generates a signal when said tire pressure reaches the level outside predetermined parameters.

17. A tire pressure monitoring system, comprising:
   a sensor mounted within a tire that senses tire air pressure;
   a receiver mounted within operative proximity to said sensor and at a location external to said tire that is electromagnetically coupled to said sensor to generate signals indicative of tire air pressure sensed by said sensor, said receiver including a first inductor and a second inductor, said first inductor and said second inductor being positioned relative to one another so that mutual interaction between said first inductor and said second inductor creates one of either a substantially zero feedback and a negative feedback; and
   a tire air pressure indicator coupled to said receiver that converts tire air pressure signals generated by said receiver into a driver readable output.

18. The system of claim 17, wherein said sensor comprises a passive circuit including an inductor, and a capacitor having a capacitance that varies in proportion to tire pressure.

19. The system of claim 18, wherein the capacitance of said capacitor is increased with increased tire air pressure and is decreased with decreased tire air pressure.

20. The system of claim 17, wherein said sensor creates an unbalanced electromagnetic field between said first and second inductors of said receiver that is directly proportional to tire air pressure to thereby produce a train of rectangular pulses indicative of said tire air pressure.

21. The system of claim 17, wherein said receiver further includes an operational amplifier for amplifying said signals generated by said receiver in response to said tire air pressure sensed by said sensor.

22. The system of claim 21, wherein said tire air pressure indicator comprises an LED interface that selectively displays both tire air pressure and a tire identification number.

23. The system of claim 22, wherein said receiver further comprises an operational amplifier that operates as a current switch to generate current pulses to said LED interface in response to said amplified signals from said operational amplifier.

24. The system of claim 17, wherein said indicator comprises a microprocessor having an associated memory coupled to said receiver output for processing signals output from said receiver for displaying current tire pressure and a tire number independently for each tire.

25. A tire pressure monitoring system, comprising:
   a sensor mounted within a tire that senses tire air pressure, said sensor including a capacitor having a capacitance that varies in proportion to the tire pressure, wherein said capacitor comprises a thin wall cylindrical capacitor having a first end isolated from said tire air and a second end open to said tire air, said capacitor being filled with an electrically conductive material that traps a volume of air between said first end and said material, said electrically conductive material compressing and decompressing said volume of air in direct relation to said tire air pressure;
   a receiver mounted within operative proximity to said sensor and at a location external to said tire that is electromagnetically coupled to said sensor to generate signals indicative of tire air pressure sensed by said sensor; and
   a tire air pressure indicator coupled to said receiver that converts tire air pressure signals generated by said receiver into a driver readable output.

26. A tire pressure monitoring system, comprising:
   a passive sensor circuit mounted within a tire that senses tire air pressure;
   a receiver mounted within operative proximity to said passive sensor circuit and at a location external to said tire, said receiver being electromagnetically coupled to said pressure sensor circuit to generate signals indicative of tire air pressure sensed by said passive sensor circuit, said receiver including at least a first inductor and a second inductor, said first inductor and said second inductor being selectively positioned relative to one another so that upon creating an electromagnetic coupling between said first inductor and said second inductor, feedback from said coupling is one of either a substantially zero feedback and a negative feedback; and
   a tire pressure status indicator coupled to said receiver that converts the signals generated by said receiver into a tire pressure status output.

27. The tire pressure monitoring system of claim 26, wherein said tire pressure indicator comprises an indicator that generates a signal when said tire pressure reaches a level outside predetermined parameters.

28. The tire pressure monitoring system of claim 26, wherein said tire pressure indicator converts tire air pressure signals generated by said receiver into a driver readable tire pressure output.

29. A tire pressure monitoring system for monitoring the pressure of at least one tire of a vehicle, said tire pressure monitoring system comprising:
   a sensor mounted within the at least one tire of the vehicle, said sensor operable to sense tire pressure within the at least one tire;
   a receiver mounted on the vehicle at a location external of the tire and within operative proximity to said sensor, said receiver operable to generate a signal indicative of the tire pressure sensed by said sensor, said receiver including a first inductor and a second inductor having a mutual coefficient $\beta$ and an amplifier having a gain K, where the mutual coefficient $\beta$ varies with the placement of said first inductor relative to said second inductor and with an inductance of said first inductor and said second inductor, said first inductor and said second inductor being positioned relative to one another such that $K\beta \leq 1$; and
   a tire pressure status indicator in communication with said receiver operable to display a tire pressure status based on the signal generated by said receiver.

30. The tire pressure monitoring system as defined in claim 29 wherein said sensor is a passive LC circuit which is in a conductive state when said tire pressure falls outside a predetermined parameter and is in a non-conductive state when said tire pressure falls within said predetermined parameter.

31. The tire pressure monitoring system as defined in claim 29 wherein said sensor comprises a passive circuit including an inductor and a capacitor having a capacitance that varies in proportion to tire pressure.

32. A monitoring system for monitoring a first parameter, said monitoring system comprising:
   a sensor positioned at a first location, said sensor operable to sense the first parameter;
   a receiver positioned at a second location remote from said first location and within operative proximity to said sensor, said receiver operable to generate signals indicative of the first parameter, said receiver including a first inductor and a second inductor, said first inductor and said second inductor being positioned relative to one another so that upon creating an electromagnetic coupling between said first inductor and said second inductor, feedback from said coupling is one of either a substantially zero feedback and a negative feedback; and
   an indicator in communication with said receiver to provide the first parameter to a user.

33. The monitoring system as defined in claim 32 wherein said sensor is mounted within a tire on a vehicle and said receiver is mounted on said vehicle, whereby said sensor is operable to sense tire pressure of said tire.

34. The monitoring system as defined in claim 32 wherein said sensor is a passive LC circuit which is in a conductive state when the first parameter falls outside a predetermined range and is in a non-conductive state when said first parameter falls within said predetermined range.

35. The monitoring system as defined in claim 32 wherein said sensor includes a passive circuit having an inductor and a capacitor having a capacitance that varies in proportion to the first parameter.

* * * * *